(12) United States Patent
Arulandu et al.

(10) Patent No.: US 12,336,068 B2
(45) Date of Patent: Jun. 17, 2025

(54) LOW POWER CONVERTER FOR COMPENSATING MAINS VOLTAGE VARIATION

(71) Applicant: SIGNIFY HOLDING B.V., Eindhoven (NL)

(72) Inventors: Karnekumar Arulandu, Breda (NL); Johan Paul Marie Gerard Linnartz, Eindhoven (NL); Johannes Adrianus Cornelis Misdom, Weert (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/280,734

(22) PCT Filed: Feb. 28, 2022

(86) PCT No.: PCT/EP2022/054982
§ 371 (c)(1),
(2) Date: Sep. 7, 2023

(87) PCT Pub. No.: WO2022/189184
PCT Pub. Date: Sep. 15, 2022

(65) Prior Publication Data
US 2024/0306275 A1   Sep. 12, 2024

(30) Foreign Application Priority Data
Mar. 11, 2021   (EP) .................................. 21162037

(51) Int. Cl.
*H05B 45/37* (2020.01)
*H02M 3/07* (2006.01)
*H02M 3/335* (2006.01)
*H05B 45/40* (2020.01)

(52) U.S. Cl.
CPC .............. *H05B 45/37* (2020.01); *H02M 3/07* (2013.01); *H02M 3/33507* (2013.01); *H05B 45/40* (2020.01)

(58) Field of Classification Search
None
See application file for complete search history.

(56) References Cited

U.S. PATENT DOCUMENTS

| | | |
|---|---|---|
| 5,999,419 A | 12/1999 | Marrero |
| 9,544,956 B2 * | 1/2017 | Chen ...................... H05B 45/39 |
| 2002/0097030 A1 | 7/2002 | Blom |
| 2014/0111102 A1 | 4/2014 | Angelin et al. |

(Continued)

*Primary Examiner* — Anh Q Tran

(57) ABSTRACT

A power converter for compensating voltage variation in a circuit, the circuit comprising: a power stage arranged for receiving a mains input and for converting the mains input into a direct current, DC, output for driving a load; and a first buffer capacitor connected in a parallel branch with the load; wherein the power converter comprises an output capacitor connected in series with the first buffer capacitor, wherein the output capacitor is arranged for connecting in series with the first buffer capacitor in said parallel branch with the load; wherein the power converter comprises a second buffer capacitor arranged for connecting in series with the first buffer capacitor; and wherein the power converter is configured to charge the output capacitor from the second buffer capacitor, when the DC output is below a predetermined threshold.

15 Claims, 2 Drawing Sheets

(56) References Cited

U.S. PATENT DOCUMENTS

| | | | |
|---|---|---|---|
| 2014/0312789 A1* | 10/2014 | Feng | H05B 45/327 |
| | | | 363/21.02 |
| 2016/0105936 A1 | 4/2016 | Melanson | |
| 2017/0251535 A1 | 8/2017 | Huang et al. | |
| 2017/0280523 A1* | 9/2017 | Kathiresan | H05B 47/10 |
| 2020/0106356 A1 | 4/2020 | Petersen | |

* cited by examiner

LOW POWER CONVERTER FOR COMPENSATING MAINS VOLTAGE VARIATION

CROSS-REFERENCE TO PRIOR APPLICATIONS

This application is the U.S. National Phase application under 35 U.S.C. § 371 of International Application No. PCT/EP2022/054982, filed on Feb. 28, 2022, which claims the benefit of European Patent Application No. 21162037.2, filed on Mar. 11, 2021. These applications are hereby incorporated by reference herein.

FIELD OF THE INVENTION

The present disclosure relates generally to power converters. More in particular, it relates to a power converter, a method for compensating voltage variation in a circuit by using the power converter, a LED based lighting device, and a circuit comprising the power converter.

BACKGROUND OF THE INVENTION

Conventional SMPS (switch mode power supplies) topologies for power conversion have been applied for decades. From a point of view of cost and efficiency, they have been proven to be quite effective. The conventional topologies have therefore become important building blocks for any type of power converter, both in the sense of up-conversion and in the sense of down-conversion. Typically, these topologies are used to convert the total load power effectively from a point of view of both cost and efficiency.

However, the price of LEDs (light emitting diodes) has dropped to a level such that the cost of a circuit for powering LEDs has become more dominant than the cost of the LEDs. Conventional power conversion topologies convert the total input power into an appropriate output power of the LEDs. This entails power conversion losses over the complete output power.

SUMMARY

It is an aim of the present disclosure to provide an improved power converter. In the context of the present disclosure, a power converter may be considered "improved" if it can lead to smaller power conversion losses, i.e. if it is more efficient.

It is a secondary aim of the present disclosure to provide a more compact and/or less costly, yet still efficient power converter.

In a first aspect of the present disclosure, there is provided a power converter for compensating voltage variation in a circuit, the circuit comprising: a power stage arranged for receiving a mains input and for converting the mains input into a direct current, DC, output for driving a load; and a first buffer capacitor; wherein the power converter comprises a series combination of an output capacitor connected in series with the first buffer capacitor, wherein the series combination is coupled in parallel with the load; a second buffer capacitor arranged for connecting in series with the first buffer capacitor; wherein the power converter is configured to charge the output capacitor from the second buffer capacitor, when the DC output is below a predetermined threshold.

The inventors have realized that utilizing the voltage drop across the load in order to only convert a small portion of the total load power, compared to a full power converter stage (usually a second stage), has one or more of the following advantages. The power converter may be more compact because it may be operated at a low voltage and at high frequencies. The power converter may be low in cost. The power converter may be efficient, because losses for power conversion only entail a small portion of the total load power. Examples according to the present disclosure therefore may provide a novel approach to power LEDs while only converting a small portion of the load power, such that mains voltage variations can be compensated.

In other words, the power converter may help to stabilize, distribute or modulate high load power, which may have one or more of the following advantages: high efficiency as only a small portion of the power is converted; low cost as low voltage components can be used; and small form factor. A small low voltage converter that can operate at high frequencies (e.g. 1 MHz-5 MHz) may only convert a fraction of the total power.

Moreover, the power converter may be applicable for driverless concepts, because it can compensate for mains variation, especially for compact designs where conventional (LED) drivers are too big to fit.

In preferred examples, the power converter is configured to charge the output capacitor from the second buffer capacitor in order to discharge the first buffer capacitor over the load. However, it is also possible to not discharge the first buffer at that time, but to keep it at constant or nearly constant charge, depending on the desired application.

Preferably, the predetermined threshold is or is electrically equivalent to a sum of voltages over the first buffer capacitor and the second buffer capacitor.

Preferably, the power converter is configured to enable the first buffer capacitor to discharge and thereby supply power to the load, when the power converter is charging the output capacitor from the second buffer capacitor.

Preferably, the power converter is configured to halt charging or reduce charging the output capacitor from the second buffer capacitor if the DC output is above the predetermined threshold.

In this manner, the power factor of the input current may be improved. Additionally or alternatively, continuity of the load current may be improved, for example by charging the output capacitor from the second buffer capacitor at a reduced rate, while the second buffer capacitor is being charged from DC output. In this situation, the first buffer capacitor may also be charged from DC output, but at least some DC output remains available for the load. Therefore, in this situation, the load current is not zero, which may advantageously lead to improved load current continuity.

In the context of the present disclosure, halting charging may be construed to mean that no charge is added and that optionally charge is removed by discharging, and reducing charging may be construed to mean either remaining charging but at a reduced rate, or halting charging as defined above.

Preferably, the load comprises a light emitting diode, LED, unit comprising at least one LED.

Preferably, the power converter comprises an inrush circuit arranged for limiting a voltage drop over the power converter when the first buffer capacitor is depleted.

Preferably, the power converter comprises a controller configured for activating and deactivating the power converter to charge the output capacitor.

Preferably, the controller is configured for said activating and said deactivating, based on at least one of: a voltage over the second buffer capacitor; a voltage over the first buffer capacitor; and a voltage supplied by the power stage.

Preferably, the power converter is further configured for modulating output current of the load during at least part of the time that the DC output is above the predetermined threshold. In this manner, undesirable variations in the output current of the load can be reduced or prevented.

Preferably, the power converter comprises a current limiter connected in series with the buffer capacitor.

In a second aspect of the present disclosure, there is provided a method for compensating voltage variation in a circuit by using a power converter of any previous claim, the circuit comprising: a power stage arranged for receiving a mains input and for converting the mains input into a direct current, DC, output for driving a load; and a first buffer capacitor connected in a parallel branch with the load; wherein the method comprises: connecting in series an output capacitor with the first buffer capacitor in said parallel branch with the load; connecting a second buffer capacitor in series with the first buffer capacitor; and charging the output capacitor from the second buffer capacitor, when the DC output is below a predetermined threshold.

It will be appreciated that the same considerations and advantages described above for the power converter may apply to the method, mutatis mutandis.

Preferably, the predetermined threshold is or is electrically equivalent to a sum of voltages over the first buffer capacitor and the second buffer capacitor.

Preferably, the method comprises enabling the first buffer capacitor to discharge and thereby supply power to the load, when the power converter is charging the output capacitor from the second buffer capacitor.

Preferably, the method comprises halting charging or reducing charging the output capacitor from the second buffer capacitor if the DC output is above the predetermined threshold.

Preferably, the load comprises a light emitting diode, LED, unit comprising at least one LED.

Preferably, the method comprises limiting a voltage drop over the power converter when the first buffer capacitor is depleted.

Preferably, the method comprises controlling the power converter by activating and deactivating the power converter to charge the output capacitor.

In a further developed example, the controlling is based on at least one of: a voltage over the second buffer capacitor; a voltage over the first buffer capacitor; and a voltage supplied by the power stage.

In a third aspect of the present disclosure, there is provided a light emitting diode, LED, based lighting device comprising a power converter according to any one of the examples described above.

It will be appreciated that the same considerations and advantages described above for the power converter may apply to the LED based lighting device, mutatis mutandis.

In a fourth aspect of the present disclosure, there is provided a circuit comprising: a power stage arranged for receiving a mains input and for converting the mains input into a direct current, DC, output for driving a load; a first buffer capacitor connected in a parallel branch with the load, and a power converter in accordance with any of the examples described above.

In a fifth aspect of the present disclosure, there is provided a lamp or luminaire comprising the power converter a circuit comprising a power stage arranged for receiving a mains input and for converting the mains input into a direct current, DC, output for driving a load a first buffer capacitor and the load.

It will be appreciated that the same considerations and advantages described above for the power converter may apply to the circuit, mutatis mutandis.

Moreover, it is to be understood that, although some preferred examples according to the present disclosure have been described separately, the skilled person may combine separately described preferred examples into an undescribed embodiment, as long as this undescribed embodiment still falls within the definition of the claims.

BRIEF DESCRIPTION OF THE DRAWINGS

In order to explain the above-described aspects, examples and embodiments more fully, the following figures are appended, in which like reference signs refer to like elements.

DETAILED DESCRIPTION

Figure 1:
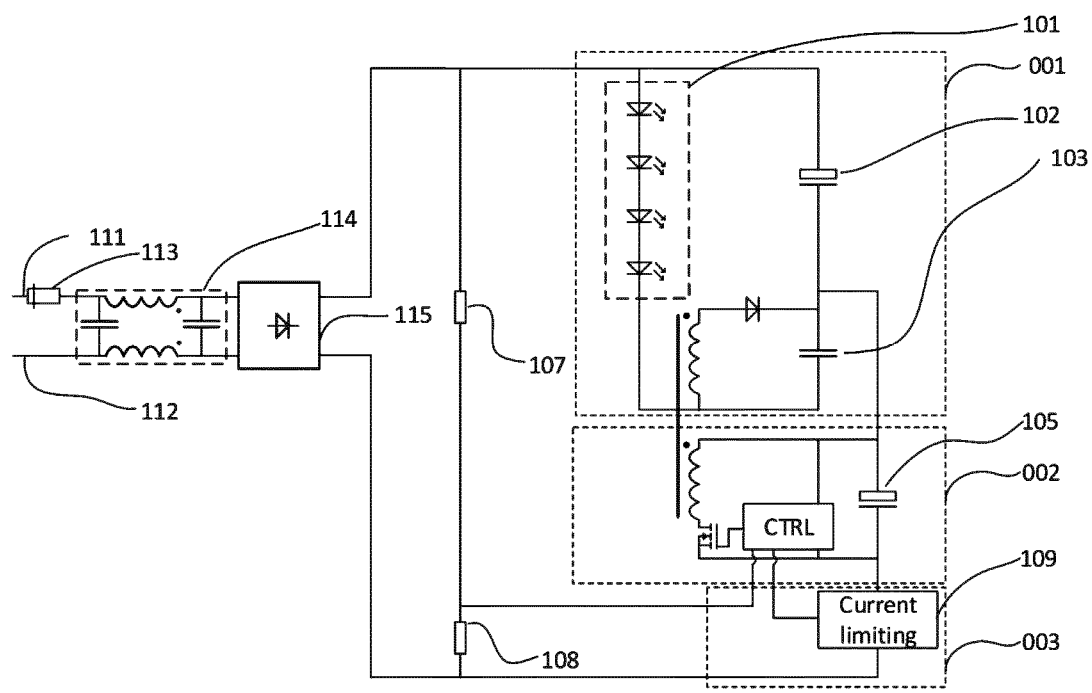
FIG. 1 shows a first example of a power converter according to the present disclosure.

FIG. 1 shows a first example of a power converter according to the present disclosure. In particular, FIG. 1 shows a schematic block diagram of a power converter for compensating voltage variation in a circuit.

In the circuit, terminals line 111, and neutral 112 are provided, to which mains can be supplied. The circuit shown also comprises a fuse 113. After the fuse 113, the power from mains passes through an EMC (electromagnetic compatibility) filter 114 and a bridge rectifier 115. These elements therefore form a power stage, arranged for receiving a mains alternating current, AC, input and for converting the mains input into a direct current, DC, output.

The DC output is supplied to the series configuration of load 001, in this example comprising a LED load 101, but any other suitable type of load 101 may be considered, power converter 002—whose output side is shown within the bounds of reference 001 because its secondary winding, diode and output capacitor 103 is in the same parallel branch with the load as first buffer capacitor 102—and an optional but preferred current limiting circuit 003. Power converter 002 is shown comprising an optional but preferred controller CTRL, configured for activating and deactivating the power converter to charge the output capacitor 103.

In contrast to driverless or linear topologies, wherein the forward voltage of the LED load 101 is typically designed to be close to the mains peak voltage, examples according to the present disclosure preferably have a forward voltage at least approximately equal to the average mains voltage, because the mains ripple is intended to be filtered out by the first buffer capacitor 102.

If the skilled person were to consider a direct parallel connection between the LED load 101 and the first buffer capacitor 102, as done in prior art, this would result in underutilization of the buffer capacitor. Furthermore, variations in mains voltage would result in high variations of light output (in case of an LED load) and/or additional power losses on the current limiting circuit 109. To effectively overcome these disadvantages, the presently described example provides a power converter 002, arranged for connecting in series with the LED load 101 and buffer capacitor 102. Note that the current limiting circuit 003 is also arranged for connecting in series with the LED load 101 and buffer capacitor 102.

The power converter 002 comprises output capacitor 103 connected in series with the first buffer capacitor 102. A series connection of the output capacitor 103 and the first buffer capacitor 102 is arranged to be coupled in parallel with the load. Therefore, the combined voltage of the first buffer capacitor 102 and the output capacitor 103 is available for buffering load 101.

The output capacitor 103 preferably has a, relatively, low capacitance compared to the first buffer capacitor 102, such that it can store only a fraction of charge in comparison to the first buffer capacitor 102. In this manner, the output capacitor 103 can advantageously smoothen the high-frequency ripple from the power converter 002.

The power converter 002 comprises a second buffer capacitor 105 arranged for connecting in series with the first buffer capacitor 102. The power converter 002 is configured to charge the output capacitor 103 from the second buffer capacitor 105, when the DC output is below a predetermined threshold, as will be further illustrated with reference to FIG. 2.

For this particular example, a fly-back topology has been chosen for the power converter, but other topologies may also be used. The skilled person will understand that, optionally, some additional circuitry may advantageously be provided in order to overcome some properties of the LEDs 101, such as fast response, low dynamic resistance, need for high efficiency.

One or more of the following benefits can be achieved when the power converter is designed to convert only a small portion of the power: the power converter can be realized with low voltage components which allows higher switching frequency smaller components; and losses are smaller as only a small portion e.g. 3% to 10% of the DC output is converted. Depending on the application requirements other benefits may be achieved, e.g. to allow a larger range for mains voltage variation. To enable the use of low voltage components, an inrush circuit may preferably be added to limit the voltage drop across the low voltage power converter when the first buffer capacitor 102 is depleted. This same inrush limiter can advantageously also be used as a controlled current source to improve the total harmonic distortion of the input current.

The LED unit 101 may preferably contain a number of LEDs such that a voltage drop over the LED unit 101 is at least approximately equal to an average voltage output of the power stage. In this sense, it is preferred if the load is based on a voltage drop over the load. In practice, LEDs can be configured in series and parallel such that they match the mains input voltage for a desired light output.

Figure 2:
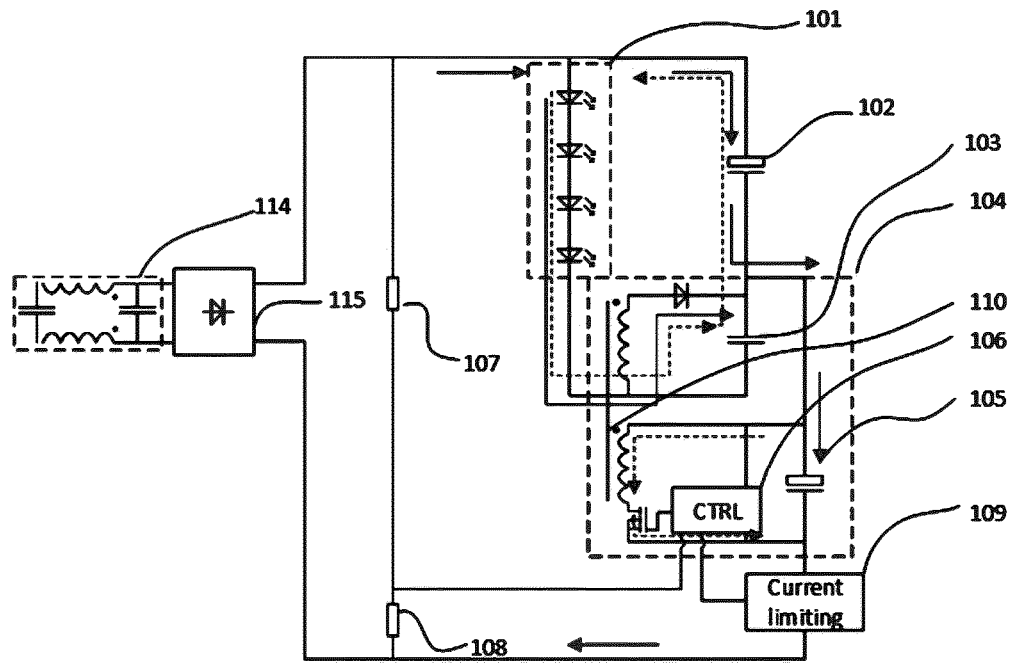
FIG. 2 shows a second example of a power converter according to the present disclosure.

FIG. 2 shows a second example of a power converter according to the present disclosure. The second example of FIG. 2 is a further development of the above-described first example of FIG. 1. Therefore, FIG. 2 largely corresponds with FIG. 1, but FIG. 2 also shows several current directions with full and dashed arrows, respectively.

To better clarify which components are comprised by the power converter, the references 001, 002 and 003 have been dropped from FIG. 2, and reference 104 for the power converter has been included in FIG. 2, compared to FIG. 1.

Utilization of the buffer capacitor is enhanced in this invention by realizing a voltage variation across the output capacitor 103 of the power converter 104 over a complete mains cycle i.e. 50 Hz or 60 Hz. When power is drawn from the mains, typically when the momentary mains voltage is high, e.g. at the peak of the mains, charge may be stored in the first and second buffer capacitors 102 and 105. The full arrows in FIG. 2 show the direction of the current path and direction for this situation.

Subsequently, when the DC output—or equivalently the time variable mains voltage—becomes lower than the sum of voltages across the first and second buffer capacitors 102 and 105, charge from the second buffer capacitor 105 may be pumped to the output capacitor 103, such that the first buffer capacitor 102 can be discharged over the load 101 (in this example again a LED load 101, but any suitable type of load may be used). Dashed arrows in FIG. 2 show the current flow and current direction for this situation.

Steady state mains voltage variations can be compensated by adapting the offset voltage drop across 105 such that the power intake remains the same and power losses in the current limiter are limited. Depending on the implementation of the current limiter, the input current waveform of this circuit can be further be enhanced to minimize THD (Total Harmonic Distortion). Surprisingly, the conduction angle and input power can also be adapted by the current limiter 109, i.e., power intake is a product of input voltage multiplied by the input current divided by the conduction time. Note that longer conduction angles may result in higher power losses as part of the cyclic (50 Hz or 60 Hz) mains voltage variation will result in higher voltage drop across the current limiter for higher conduction angles.

In a practical embodiment, resistors 107 and 108 may be used by the controller CTRL in order to determine the DC output voltage as well as voltage over the load and voltage over the first and second buffer capacitors 102 and 105.

Alternatively but equivalently formulated, the power converter may be configured for, when activated, charging the output capacitor using the second buffer capacitor. In this case, the power converter may preferably be configured for, when activated, charging the output capacitor based on a charge state of the first buffer capacitor and the second buffer capacitor, preferably based on a sum charge of the first buffer capacitor and the second buffer capacitor. Furthermore, in this case, the power converter may preferably be deactivated if a characteristic of the mains input, preferably the absolute effective voltage of the mains input, has a greater value than a predetermined threshold value.

In a practical example, charging of the first buffer capacitor 102 and the second buffer capacitor 105 may be halted by disabling the current limiter 109.

In a further development, it may be considered to use a composite threshold value, i.e. a separate lower threshold value and a separate higher threshold value, to produce a hysteresis-like effect.

Figure 3:
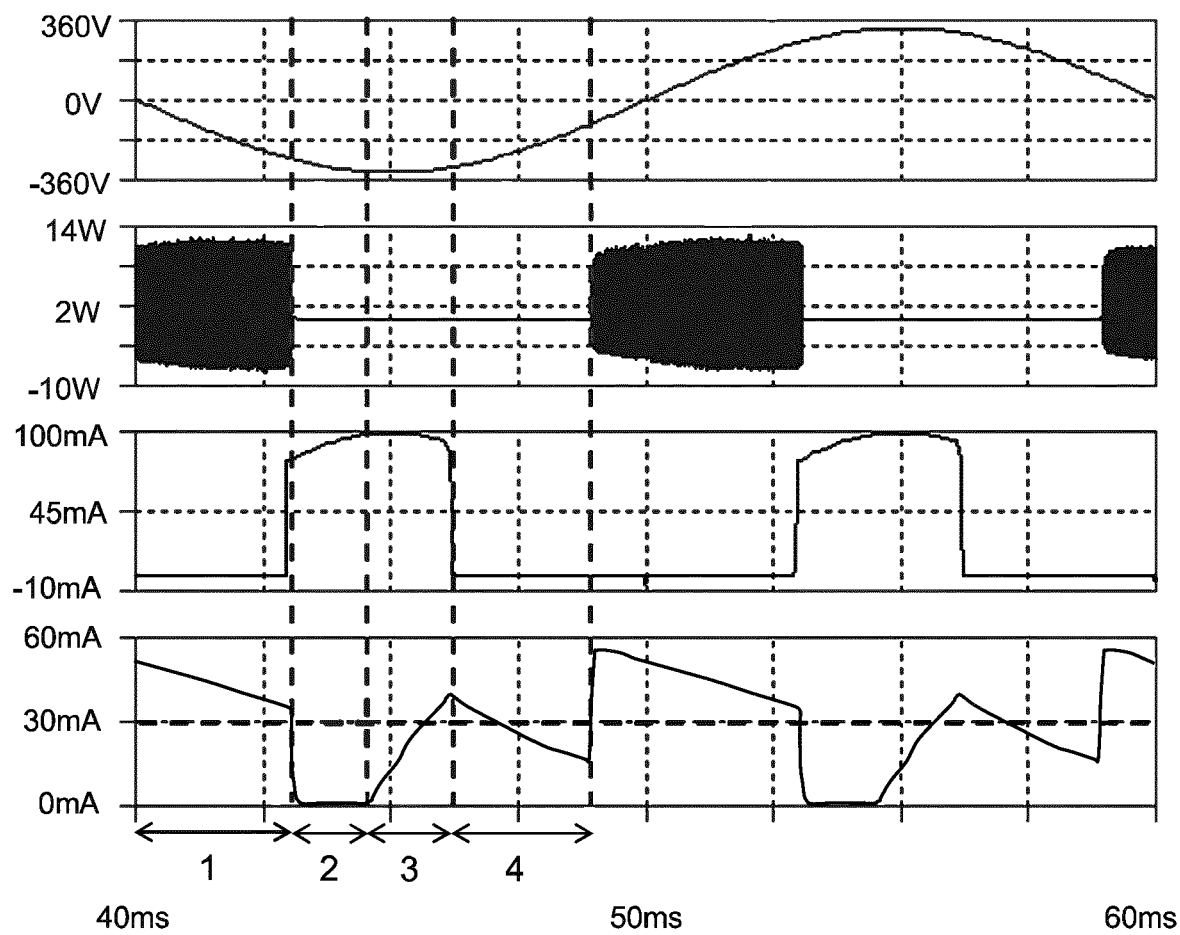
FIG. 3 shows simulation results of a model of an example of a power converter according to the present disclosure.

FIG. 3 shows simulation results of a model of an example of a power converter according to the present disclosure, simulated in LTspice. For a steady state condition mains Vac is constant. The mains input voltage as function of time is shown in the top plot pane. The second plot pane from the top shows power of the power converter. The third plot pane from the top shows mains input current. The fourth plot pane from the top shows LED current in an example implementation.

For the condition where the momentary mains voltage (interval 1) is lower than a predetermined threshold, the power converter is activated as shown in the second plot pane. In this situation (interval 1), no input current is drawn from mains, as is shown in the third plot pane, and the LED current is supplied by discharging the first and second buffer capacitors 102 and 105.

In other words, interval 1 commences when the first and second capacitors 102 and 105 are sufficiently charged but DC output (or equivalently, mains voltage) becomes too low, namely lower than a predetermined threshold. In this example, it is preferred to set the predetermined threshold to the summed voltage over the first and second buffer capacitors 102 and 105. At the start of interval 1, the power converter is activated, in order to charge the output capacitor 103 from the second buffer capacitor 105. As no current is drawn from mains, current is supplied to the LEDs by actively discharging the first and second buffer capacitors 102 and 105.

For the condition where the momentary voltage of mains is greater than the sum voltage drop across the first and second buffer capacitors 102 and 105 (interval 2), current is drawn from mains and the first and second buffer capacitors 102 and 105 are charged. It is worth noting that the power converter 104 in this interval 2 may be deactivated, i.e. switched off, and, because the second buffer capacitor 105 is depleted, the LED current is less. In this specific example, the LED current is zero. However, in further developed examples, the power converter 104 may preferably be further configured for modulating output current of the load 101 during at least part of the time that the DC output is above the predetermined threshold, for example at least during interval 2. In other words, the power converter 104 may be further set, based on the specific operating conditions of the load, to smooth out the LED current and to reduce or prevent current discontinuity of the LED current. This can be done by controlling the power of the power converter. In this manner, undesirable flickering or strobe-effects may be reduced.

In other words, in interval 2, DC output again exceeds a predetermined threshold. Equivalently, mains voltage becomes high enough, e.g. higher than the summed voltage over the first and second buffer capacitors 102 and 105. At the start of interval 2, the power converter 104 is deactivated, so it no longer charges the output capacitor 103. In this interval 2, current again is drawn from mains, in order to charge the first and second buffer capacitors 102 and 105. In this interval 2, no current is supplied to the LEDs (because the second buffer capacitor 105 is depleted).

As the buffer capacitors remain charging during interval 3, the LED current starts to increase until the mains voltage is lower than the sum of voltage drop across the first and second buffer capacitors 102 and 105, which thus constitutes a predetermined threshold.

In other words, at the start of interval 3, the second buffer capacitor 105 becomes sufficiently charged, while mains voltage remains high enough, e.g. higher than the summed voltage over the first and second buffer capacitors 102 and 105. The power converter 104 remains deactivated, and current is still being drawn from mains, which current is used for charging the first buffer capacitor 102. Any "excess" current no longer needed for charging the second buffer capacitor 105 can advantageously be supplied to the LEDs, which can be seen by the increasing LED current in the fourth plot pane of FIG. 3.

Within interval 4, the LEDs are passively supplied by the discharging of the first buffer capacitor 102. After passively discharging the first buffer capacitor 102, the power converter 104 is activated again for actively discharging the first and second buffer capacitors 102 and 105. This concludes the four states of operation for a half mains cycle.

In other words, interval 4 starts when DC output becomes lower than a predetermined threshold, e.g. when mains voltage becomes lower than the summed voltage over the first and second buffer capacitors 102 and 105. Power converter 104 remains deactivated, and no current is being drawn from mains. Current is supplied to the LEDs by passively discharging the first buffer capacitor 102.

It is contemplated to further enhance the operation of the power converter 104 such that the current ripple through the LEDs can be minimized even further.

In the examples provided, the second buffer capacitor 105 may be coupled between a node, between the first buffer capacitor 102 and the output capacitor 103, and a return node to the rectifier 115. In the connection to the return node, the current limiting circuit 109 may be comprised.

It will be understood that some electronic elements of embodiments of the present disclosure may be replaced by other, equivalent, electronic elements without changing the essential functional characteristics of the embodiments. Moreover, it will be understood that, in practice, particular electronic elements may be added to embodiments of the present disclosure in order to achieve particular goals, e.g. improved electromagnetic compatibility or improved dissipation characteristics.

The invention claimed is:

1. A power converter for compensating voltage variation in a circuit, the circuit comprising:
   a power stage, comprising a rectifier, arranged for receiving a mains input and for converting the mains input into a direct current, DC, output for driving a load; and
   a first buffer capacitor;
   wherein the power converter comprises:
   a series combination of an output capacitor connected in series with the first buffer capacitor, wherein the series combination is coupled in parallel with the load;
   a second buffer capacitor arranged for connecting in series with the first buffer capacitor, wherein the second buffer capacitor is coupled between a node between the first buffer capacitor and the output capacitor, and a return node to the rectifier; and
   wherein the power converter is configured to charge the output capacitor from the second buffer capacitor, when the DC output is below a predetermined threshold.

2. The power converter according to claim 1, wherein the predetermined threshold is or is electrically equivalent to a sum of voltages over the first buffer capacitor and the second buffer capacitor.

3. The power converter according to claim 1, wherein the power converter is configured to enable the first buffer capacitor to discharge and thereby supply power to the load, when the power converter is charging the output capacitor from the second buffer capacitor.

4. The power converter according to claim 1, wherein the power converter is configured to halt charging or reduce charging the output capacitor from the second buffer capacitor if the DC output is above the predetermined threshold.

5. The power converter according to claim 1, wherein the load comprises a light emitting diode, LED, unit comprising at least one LED.

6. The power converter according to claim 1, comprising an inrush circuit arranged for limiting a voltage drop over the power converter when the first buffer capacitor is depleted.

7. The power converter according to claim 1, comprising a controller configured for activating and deactivating the power converter to charge the output capacitor.

8. The power converter according to claim 7, wherein the controller is configured for said activating and said deactivating, based on at least one of:
   a voltage over the second buffer capacitor;

a voltage over the first buffer capacitor; and a voltage supplied by the power stage.

9. The power converter according to claim 1, wherein the power converter is further configured for modulating output current of the load during at least part of the time that the DC output is above the predetermined threshold.

10. A method for compensating voltage variation in a circuit by using a power converter, the circuit comprising: a power stage arranged for receiving a mains input and for converting the mains input into a direct current, DC, output for driving a load; and a first buffer capacitor; wherein the method comprises:
- connecting a series combination of an output capacitor and the first buffer capacitor in parallel with the load;
- connecting a second buffer capacitor in series with the first buffer capacitor; and
- charging the output capacitor from the second buffer capacitor, when the DC output is below a predetermined threshold.

11. The method of claim 10, wherein the predetermined threshold is or is electrically equivalent to a sum of voltages over the first buffer capacitor and the second buffer capacitor.

12. The method of claim 10, comprising enabling the first buffer capacitor to discharge and thereby supply power to the load, when the power converter is charging the output capacitor from the second buffer capacitor.

13. The method of claim 10, comprising halting charging or reducing charging the output capacitor from the second buffer capacitor if the DC output is above the predetermined threshold.

14. A light emitting diode (LED) based lighting device comprising the power converter according to claim 1.

15. A lamp or luminaire comprising:

the power converter in accordance with claim 1; and a circuit comprising:

a power stage arranged for receiving a mains input and for converting the mains input into a direct current, DC, output for driving a load;

a first buffer capacitor; and the load.

* * * * *